United States Patent [19]
DeChico et al.

[11] Patent Number: 5,257,243
[45] Date of Patent: Oct. 26, 1993

[54] FLEXIBLE ACOUSTIC ARRAY WITH POLYMER HYDROPHONES

[75] Inventors: Robert A. DeChico, Pennington, N.J.; James F. McEachern, Newtown; Timothy L. Kraynak, Ambler, both of Pa.

[73] Assignee: The United States of America as represented by the Secretary of the Navy, Washington, D.C.

[21] Appl. No.: 954,107

[22] Filed: Sep. 28, 1992

[51] Int. Cl.⁵ .......................................... H04R 17/00
[52] U.S. Cl. ................................... 367/169; 367/155
[58] Field of Search ............... 367/140, 149, 153, 154, 367/155, 169, 173

[56] References Cited

U.S. PATENT DOCUMENTS 3,881,165  4/1975  Parker et al. .................. 367/169
4,187,556  2/1980  Jones ................................ 367/155

Primary Examiner—Ian J. Lobo
Attorney, Agent, or Firm—James V. Tura; James B. Bechtel; Susan E. Verona

[57] ABSTRACT

An acoustic array having polymer hydrophones is disclosed. The array comprises a plastic roll, a plurality of polymer piezoelectric sensors affixed to the roll and electrodes that interconnect the sensors to utilization means such as those found for underwater detection systems or geophysical detection systems such as seismic detectors. The plastic roll has a pliant characteristic so as to readily assume a predetermined shape as well as, preferably, having a strong tendency to unravel and is of a relatively thin material. Similarly, the piezoelectric sensors have a pliant characteristic, are relatively thin, and are affixed to one of the surfaces of the plastic roll. Further, the electrodes have a pliant characteristic, are relatively thin, and are affixed to the same surface of the roll as the sensors. The overall effect of these thin and compliant elements is to provide an array having a high packing density, so that a relatively large array may be stored in a relatively small housing, such as that found in a sonobuoy. The high packing density array of the present invention may be arranged to form various directional type receiving of transmitting devices.

10 Claims, 5 Drawing Sheets

FLEXIBLE ACOUSTIC ARRAY WITH POLYMER HYDROPHONES

STATEMENT OF GOVERNMENT INTEREST

The invention described herein may be manufactured and used by and for the Government of the United States of America for governmental purposes without the payment of any royalties thereon or therefor.

BACKGROUND OF THE INVENTION

The present invention relates to an acoustical array of hydrophones used for underwater detection purposes and, more particularly, to a roll of polymer piezoelectric transducers deployable in a variety of arrays and which arrays may be rolled up into a cylindrical shape and neatly and conveniently stored in a shaped housing, such as those cylindrical housings founds in sonobuoys.

Arrays of transducers for underwater listening purposes are well known and such arrays usually consist of rigid rods, springs and separate ceramic elements clamped to the array's structure with external wire. Such arrays have many mechanical parts and are awkward to handle. Further, the packaging of such arrays does not make effective use of available space because of the overall excessive volume occupied by the arrays themselves.

Transducers serving as hydrophones are well known and one such is described in U.S. Pat. No. 3,881,165 ('165) of Parker et. al. The '165 patent discloses a single hydrophone comprising a flexible tubular core which is dimensioned so as to be slidable within a polyvinyl chloride tubing or potted in a flexible resin coating. It is desired that means be provided for arranging an array of hydrophones having a flexible characteristic.

U.S. Pat. No. 4,187,556 ('556) of Jones discloses piezoelectric transducers that may be formed into a particular shape, so as to focus the acoustic energy into a desired band for subsequent detection and utilization by electrical circuitry. The '556 patent further discloses an arrangement of the piezoelectric elements into an array, so as to selectively gather acoustic energy for underwater detection purposes. It is desired that the features of such an array be provided, while at the same time allowing the array to be easily packaged and stowed and, then, easily placed into a deployed condition for usage by an underwater detection system.

SUMMARY OF THE INVENTION

The present invention is directed to an acoustic array comprising a plastic roll, a series of polymer piezoelectric sensors affixed to the roll, and electrodes that interconnect the sensors to an external utilization means.

The present invention provides transducers arranged into preselectable arrays. Each of the arrays comprises a tubular roll of plastic material having predetermined length and width dimensions with the material having an inner and an outer surface. The plastic material has a characteristic of being pliant so as to readily assume a predetermined shape, but also, preferably, has a characteristic that produces a strong tendency to uncoil or unravel from the predetermined shape. The array further comprises a plurality of transducers each being of a polymer piezoelectric material having a characteristic of being pliant to readily assume the predetermined shape. The plurality of transducers are affixed to one of the surfaces of the plastic material and are predeterminedly located on the surface, so as to be arranged into one of the preselectable arrays. A plurality of electrodes are respectively connected to each of the plurality of transducers with each of the electrodes also having a characteristic of being pliant to readily assume a predetermined shape. Each of the electrodes has provisions so that one of its ends may be connected to external utilization means of the array.

In operation, when the tubular roll is coiled-up, it readily assumes a stowed condition having a shape corresponding to the predetermined shape. When the tubular roll is uncoiled, it readily assumes its deployed condition and the transducers are arranged into the preselectable arrays for use by the external utilization means. The arrays of the present invention are especially suited for sonar applications because the sonar's housings are normally cylindrical in shape and the arrays may be easily and neatly stored within such housings. The compliable array of the present invention also finds many applications for underwater detection systems, as well as for geophysical usages such as seismic detection systems.

Accordingly, it is an object of the present invention to provide a compliant array having a plurality of polymer piezoelectric sensors that may be easily arranged into various preselected arrays to be used for acoustic energy detection purposes.

It is a further object of the present invention to provide an array having virtually no moving parts, reliable, and substantially reduced in cost because of the relatively inexpensive sensors and plastic material comprising the array.

Other objects, advantages and novel features of the invention will become apparent from the following detailed description when considered in conjunction with the accompanying drawings therein.

DESCRIPTION OF THE PREFERRED EMBODIMENT

Figure 1:
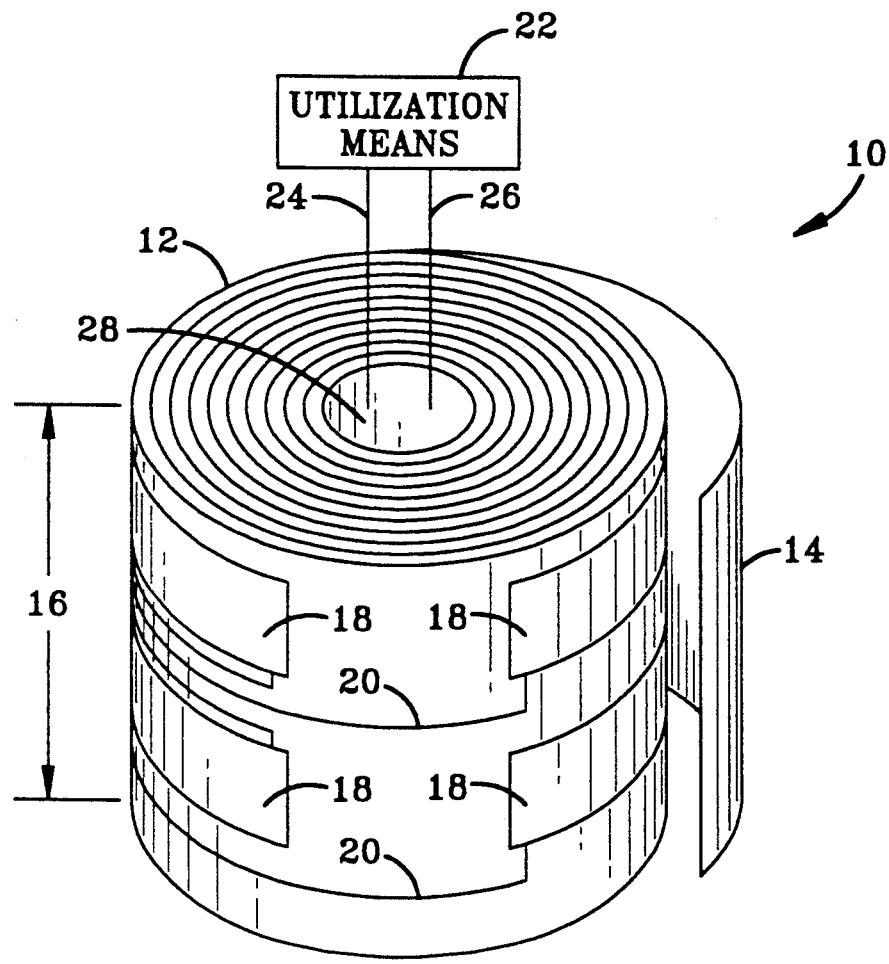
FIG. 1 is an isometric view showing the acoustic array of the present invention in its stowed or coiled-up condition.

FIG. 1 is an isometric view of a flexible acoustic array 10 according to the present invention comprising polymer hydrophones for listening to sound transmitted through water. The flexible array 10 comprises a tubular roll of plastic material 12, having a leading edge 14, a predetermined width 16 and a predetermined length (not shown). The array 10 further comprises a plurality of transducers 18 serving as hydrophones, each being of a polymer piezoelectric material, and a plurality of electrodes 20 respectively connected to the plurality of transducers 18. The array 10 is interconnected to utilization means 22 by means of conductive paths 24 and 26 and an interface device 28.

The roll of tubular plastic material 12 has inner and outer surfaces and a characteristic of being pliant to be coiled-up, so as to readily assume a predetermined shape and, conversely and preferably, having a characteristic that produces a strong tendency to uncoil from that predetermined shape. A plastic material that has a strong tendency to uncoil is known as ULTEM which is available from General Electric Company. When properly arranged, the ULTEM material has a "memory" which wants to return to a long rod configuration when seeking its uncoiled condition.

The flexible plastic rod 12 may comprise mylar or polyethylene material and have the characteristics which include the following: relatively high tensile strength, ability to extrude into thin (1 mil) sheets, compatibility with "painted on" conductive wire, and a density close to that of sea water for underwater applications of the array 10.

In their operative state, the transducers 18, transform compression waves, in a liquid medium, into electrical waves for subsequent use in electrical circuits and, conversely, may transform electrical waves of an electrical circuit into compression waves in a liquid medium. The transducers may serve as devices that are used for underwater detection such as the previously mentioned hydrophones used in water, or may be used in other mediums such as in geophysical survey applications involving seismic detection of the movement within a solid medium, such as the earth or ground. For underwater applications, the polymer transducers are advantageous because they respond to compression type conditions. The transducers 8, also have a characteristic of being pliant to be coiled up and readily assume the predetermined shape. The piezoelectric transducers 18 may be of a polymer material, such as polyvinylidene fluoride (PVDF) having a thickness in the range of about 20 mils.

In a manner as described for the roll 12 and transducers 18, the electrodes 20 also have a characteristic of being pliant, so as to assume the predetermined shape. The electrodes may be of a type selected from the group comprising laminates in the form of thin flexible cables, coated or "painted on" in the form of an electrically conductive material or wire, and deposited in the form of a pliant surface of an electrically conductive material. The electrodes may have other forms so long as the electrodes have a pliant characteristic. The electrodes 20, the transducers 18 and the flexible array 10 may also be further described with reference to FIG. 2.

Figure 2:
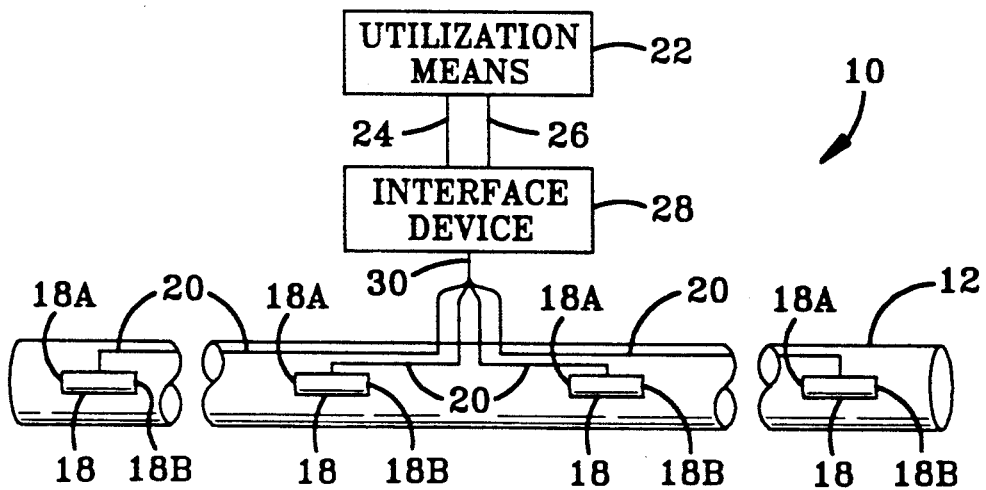
FIG. 2 is a schematic showing additional features of the array of FIG. 1.

In general, FIG. 2 illustrates the properly dimensioned and spaced apart transducers 18 as being interconnected by electrodes 20. Each of the transducers 18 and its associated electrodes may be placed on the inner or the outer surface of the tubular roll 12. The pliant characteristic of the transducers 18 is illustrated in FIG. 2 by means of the contoured surfaces 18A and 18B which comply or take the shape of the surface of the tubular plastic roll 12. The transducers 18, may be affixed to either side of the surface of the predetermined width 16 (See FIG. 1) of the tubular roll 12 by means of a compliant silicone material, such as the commonly known RTV type. The number of electrodes 20 that is connected to the respective transducer 18 is dependant on the number of layers being used for the transducer 18, as well as the circuit arrangement that utilizes the pressure sensitive information provided by the polymer piezoelectric transducer 18. However, for the sake of clarity, there is only shown one electrode as being associated with each transducer 18. Further, the tubular roll 12 is not shown as containing an inner substance; however, if desired, the tubular roll 12 may contain a substance which provides for an improved impedance match between the transducers, mounted on the inner surface of roll 12, and the liquid medium in which the transducers operate. In sonobuoy applications, a water-filled-plastic cylinder is commonly used to stabilize underwater sonar components so as to maintain a particular mode of operation without deviation.

Each of the electrodes 20 has provisions so that its end (not connected to transducer 18) may be connected to the utilization means 22, by way of a cable run 30, an interface device 28, and conductive paths 24 and 26. The utilization means 22 may be an underwater listening device or a geophysical survey device, both of which use the transducers 18 as receiving elements. Although it is possible to use piezoelectric polymer as a hydrophone (receiver) and/or as a projector (transmitter), the material is primarily used as a hydrophone. Piezoelectric polymer is typically considered to be inefficient as a projector material.

The piezoelectric polymer elements are basically high impedance devices, which can be electrically represented by a capacitor and a resister in series. As such, these elements must be sealed, i.e., watertight, so as to preclude partial shorting of the electrical signal. A waterproofing film's thickness, to be further described, is a function of the specific material and the amount of time the sonar listening device is to be in the water (permeability factor). Often, sonobuoy's operational life is only about one hour; therefore relatively thin sealant films can be utilized for such applications.

Figure 3:
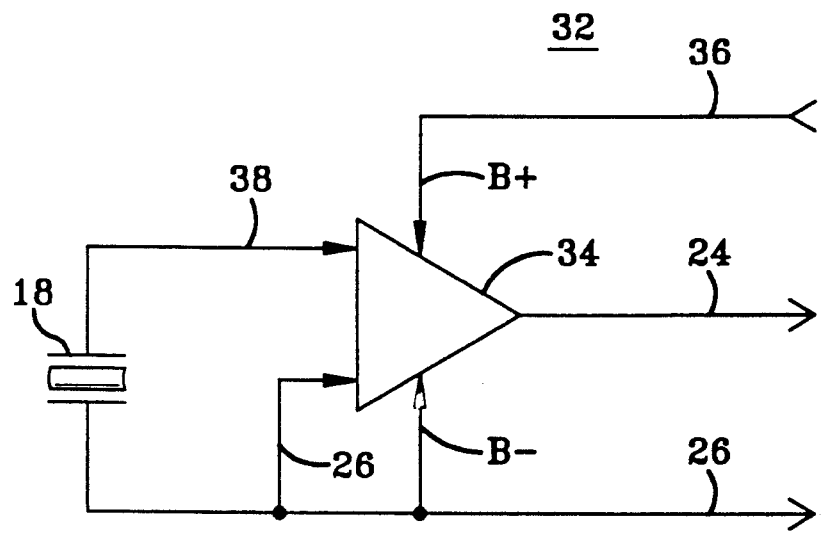
FIG. 3 is a schematic illustrating a hydrophone preamplifier arrangement.

The hydrophone 18 is commonly operated with a circuit arrangement 32 shown in FIG. 3 as employing a preamplifier 34 which is placed in close proximity to the hydrophone 18. Preamplifier 34 normally requires d. c. voltages (B+ and B−) which are typically supplied by way of the previously mentioned cable 30 typically connected to appropriate batteries. As shown in FIG. 3, the B− is applied to the preamplifier 34 by way of the conductive path 26, whereas the B+ is applied to the preamplifier 34 by way of conductive path 36. The conductive path 26 also acts as the signal (low) path for both the hydrophone 18 and the preamplifier 34.

Figure 4:
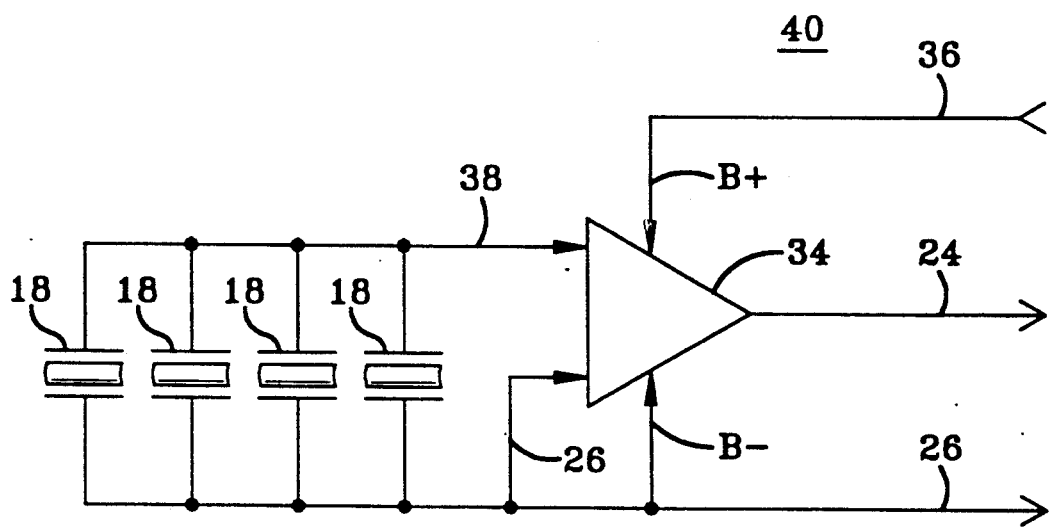
FIG. 4 is a schematic illustrating parallel arranged hydrophones that are fed into a preamplifier.

In operation, the typical wave signal of the hydrophone 18 is applied to the preamplifier 34 by way of conductive paths 26 and 38. The preamplifier 34 accepts and amplifies the wave signal from the hydrophone 18 and generates an output signal to the utilization means 22 by way of signal paths 24 (high) and 26 (low). The operation of preamplifier 34 also minimizes the effect of stray cable capacitance associated with hydrophone 18 which may otherwise have a detrimental effect. Sometimes a small number of hydrophones 18 are used with the preamplifier 34 arranged in a circuit, such as circuit 40 of FIG. 4.

Circuit 40 arranges the hydrophones 18 in a parallel manner so that their combined output is fed into the input of the preamplifier 34 which operates to supply an amplified signal onto the conductive paths 24 and 26. Present state of the art preamplifiers utilize very large scale integration (VLSI) circuitry which may fit in a preferably rigid plastic housing having dimensions of about 3 mm×3 mm×1 mm. It is desired that the preamplifiers 34 and the polymer hydrophones 18 be arranged so as to not accumulatively stack up in a coiled-like configuration that would otherwise cause excessive bulging of the desired cylindrical shape of the array 10. An array 10 employing the principals of the present invention and used for sonar applications is shown in FIG. 5.

Figure 5A:
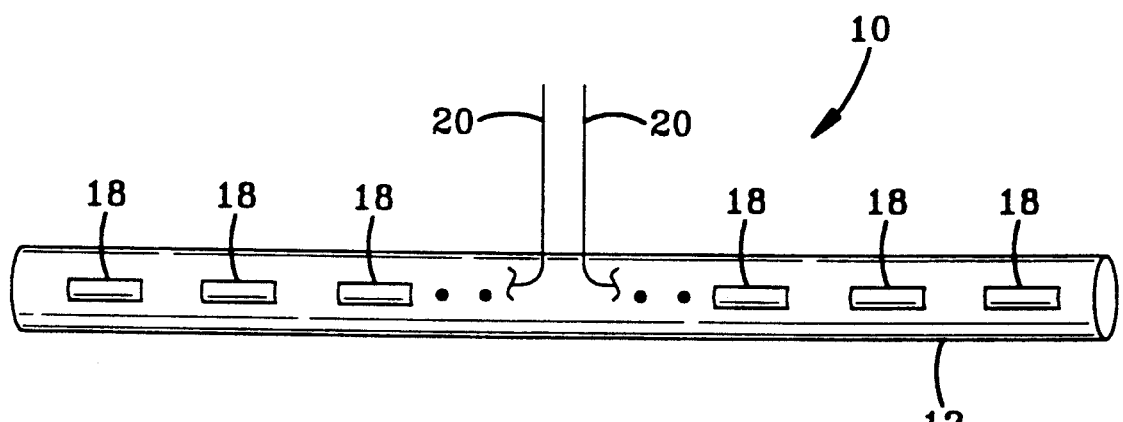
FIGS. 5(a), (b), (c), (d), and (e) illustrate a family of configurations of arrays relating to the uncoiled or deployed condition of the flexible acoustic array of FIG. 1.
Figure 5B:
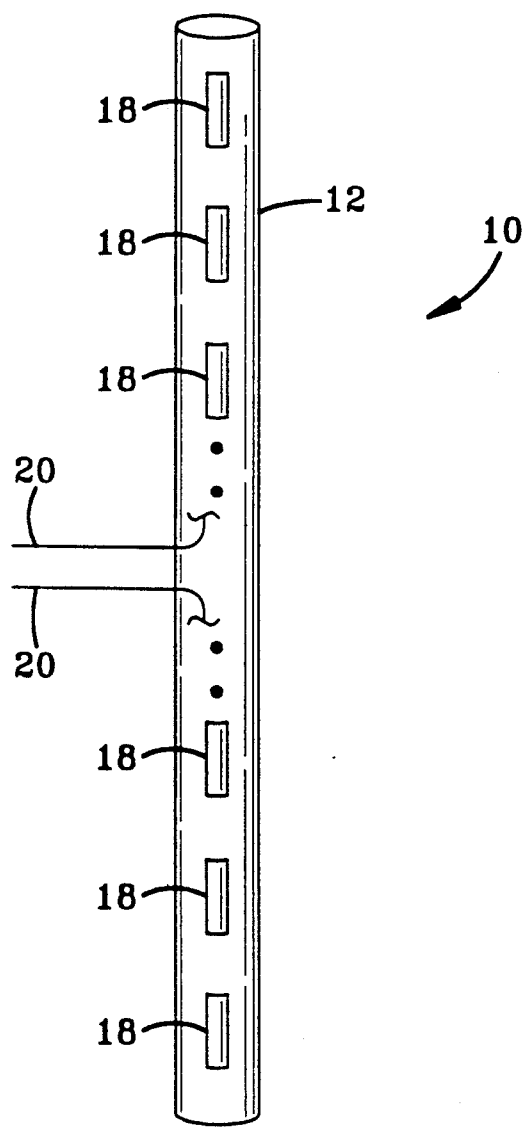

In one embodiment, the array 10 of FIG. 5A, 5B may preferably comprise a very thin (1 mil) plastic that is configured into a long, closed, cylindrical configuration, having the dimensions of 2 inches in diameter by 120 inches in length. This embodiment may be easily rolled up into a coil, before deployment. Once deployed, the interior of the cylinder could be filled with sea water, by appropriate means, to affect a long, relatively rigid cylinder.

Figures 5C, 5D:
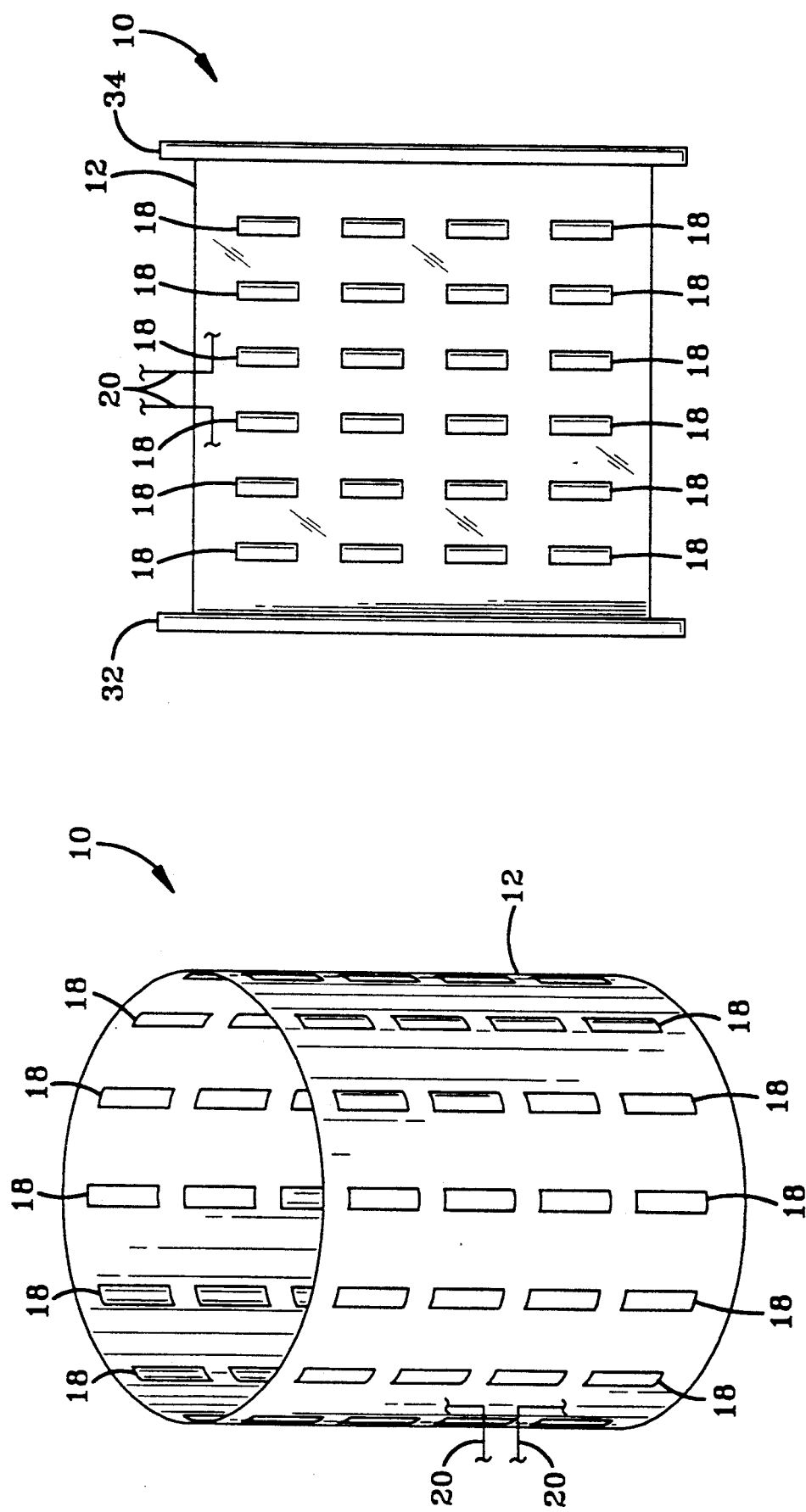

Another embodiment of the array 10 may take the form of a configuration of a closed, thin-wall cylinder such as that shown in FIG. 5(c), to be described. In this embodiment, the plastic cylinder would be larger in diameter, than previous arrays, and provides a convenient platform for mounting many hydrophones 18. The type of plastic used for these thin-walled embodiments may comprise mylar or polyethylene.

The conductive paths 24 and 26 primarily serve as the means for connecting the utilization means to the interface device 28, whereas the cable run 30 primarily serves as a means for connecting the electrodes 20 to the interface device 28. As to be further described, the interface device 28 may comprise means to maintain the information that is present on the cable run 30, as the flexible array 10 of FIG. 1 is transitioned from its stowed to its deployed condition. The interface device 28 may, also, contain appropriate electronics for amplifying and/or conditioning the electrical signals coming from the piezoelectric polymer elements.

The piezoelectric transducers 18 may be affixed to the plastic roll 12 by an adhesive that has ductility, so as to allow for some stress relief as the plastic roll is coiled-up (stowed condition) and uncoiled (deployed condition). When the transducer is to be placed onto the outer surface of the plastic roll 12, it is desired that the transducers be adhered to the plastic roll 12 in its spanwise direction (See FIG. 1, reference number 16) when the plastic roll is in its uncoiled condition. The placement of the transducers on this laid-out width dimension 16 of the uncoiled condition of the roll 12, results in an overall reduction of stress in the transducers even though there is a slight increase in the stress, in the lengthwise condition, when the roll 12 is rolled into its stowed configuration. For the placement of the transducers 18 on the inside surface of the roll 12, the affixing of the transducer to the plastic roll is essentially the same as the previously described method, except that allowance should be made for the transducers to be further stressed in the spanwise direction 16 of the roll, when the roll is coiled into its stowed condition.

The flexible array 10 of polymer hydrophones, shown in FIGS. 1 & 2, has a directional characteristic determined by properly dimensioned and spaced apart polymer piezoelectric transducers of the present invention. The array 10 may serve as a device for receiving acoustic energy and may also serve as a device that is driven by electrical energy for the purpose of obtaining a certain directional pattern along with a desired power gain.

The array 10 has virtually no moving parts which makes the device extremely simple and, more importantly, reliable. The cost of the device is low because of the polymer transducers and plastic roll material comprising the array 10 would be relatively inexpensive in large scale production quantities. The array is also very space efficient because of the thinness of the materials, and the ability of each of the components comprising the array to be rolled into a predetermined shape, such as a cylindrical shape. The cylindrical shape is particularly suited for sonobuoy applications because the sonobuoy are normal cylindrical in shape and the cylindrical array 10 fits very nicely into the cylindrical housing of the sonobuoys. The array 10 has a high-packaging density which allows the principles of the present invention to be used for relatively large array-beam devices in that the overall volume occupied by the array 10 is only that of a typical small array, not having the benefits of the present invention.

Figure 5E:
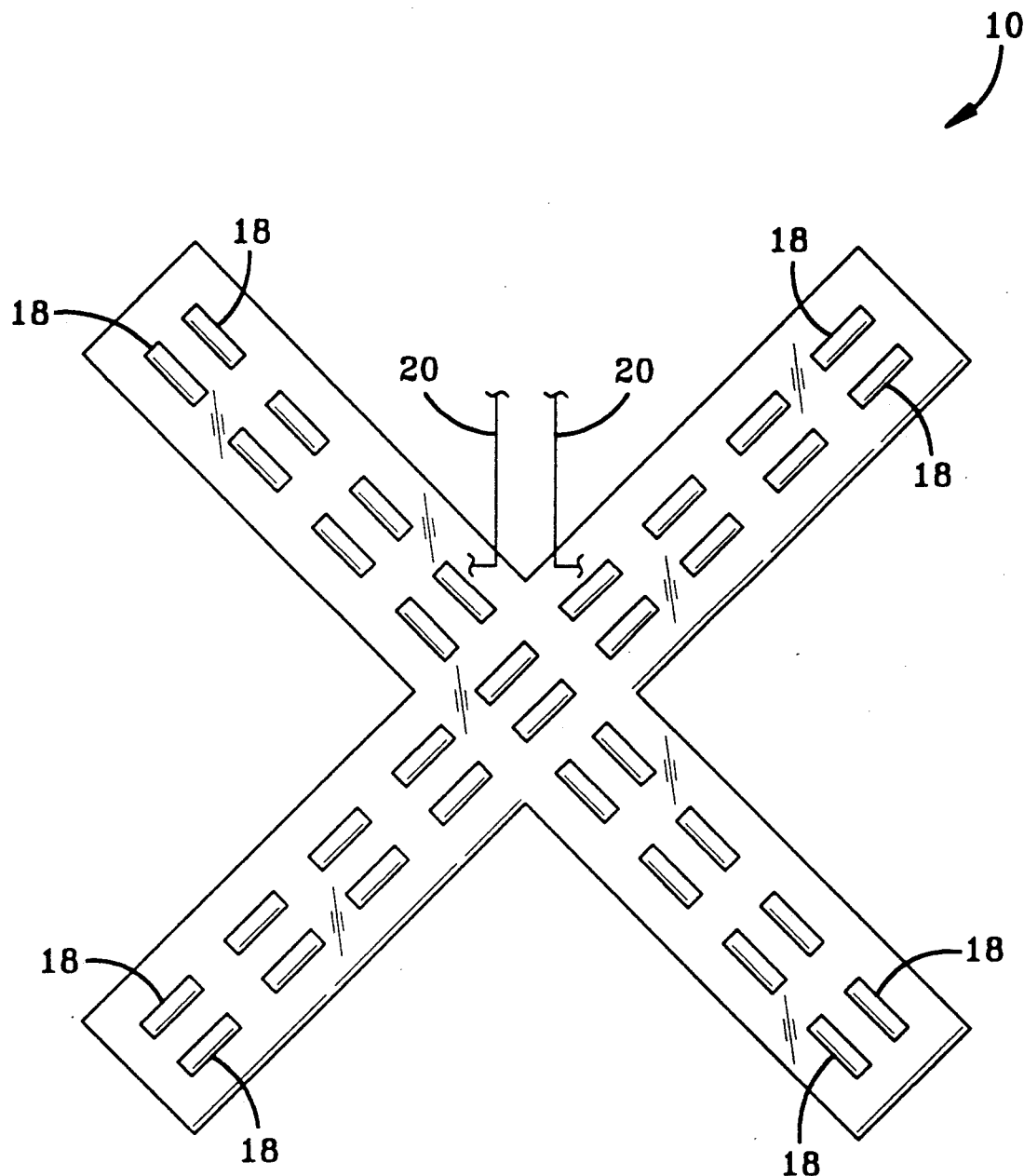

The array 10, because of its flexible and compliant characteristics, may be deployed in various shapes having different geometries, such as those of FIGS. 5(a)-5(e) which show the transducers 18 and the electrodes 20 affixed to the plastic roll 12. The geometrical features of some of the arrays of the present invention are generally described below with reference to FIGS. 5(a)-5(e) which essentially show only the arrangement of the transducers 18:

FIG. 5(a) shows the transducers 18 being arranged on roll 12 in an horizontal, x-axis orientation;

FIG. 5(b) illustrates the transducers 18 being arranged on roll 12 in a vertical, y-axis orientation;

FIG. 5(c) shows the transducers 18 positioned on a tubular plastic roll 12 and arranged to have a cylindrical shape and which roll provides a platform for mounting many hydrophones onto a volumetric array; i.e., an array in which the sensors (transducers 18) are predeterminedly located in three (3) dimensions, those being the x, y, and axes;

FIG. 5(d) illustrates an array having the form of a curtain with the plastic roll 12 being spread between several plastic roll beams, such as 32 and 34; and FIG. 5(e) illustrates an array having the form of a cross arranged in the horizontal plane.

Although the illustration of FIGS. 5(a)-5(e) are shown as desired arrays, it should be realized that due to the compliant nature of the plastic roll, the polymer transducers 18, and the electrodes 20, any array having almost any conceivable shape may be configured by the practice of the present invention. The beneficial aspects of these compliant elements may be further described with reference in FIG. 1.

FIG. 1 shows the array 10 in its coiled-up or stowed condition. In operation, the act of coiling of the tubular plastic material 12, such as ULTEM previously mentioned, into its stowed condition results in the creation of potential energy stored in the array 10. When it is desired to deploy the array 10 so that it may take its desired shape, such as those shown in FIGS. 5(a)-(e), all that is necessary is to initiate the uncoiling of the array 10, so that the potential energy stored in the roll causes the roll 12 to spring outward so as to unravel and to seek and obtain its deployed configuration, such as any of the arrangements of the arrays illustrated in FIGS. 5(a)-(e). For those plastic material 12 that do not create and store potential energy such as that stored by ULTEM, the array 10 may exploit the effects of gravity, wave action, or an electrically driven water pump.

It is contemplated by the practice of the present invention, that the roll 12 may have a lengthwise dimension from about 10-100 feet so that the transducers affixed thereto may be spaced apart to form a relatively long array, such as the horizontal array of FIG. 5(a) or the vertical array of FIG. 5(b). When the array 10 is placed into the water, the interface means 28 ensures that the electrical connection between the utilization means 22 and the array is maintained even in spite of stormy sea conditions. When the array of one embodiment having a plastic roll 12 with a strong tendency to uncoil enters the water, the potential energy stored in the roll 12 causes the array 10 to unravel. In another embodiment, the plastic roll 12 is unravelled by the assistance of gravity and a terminal weight. The unravelling is completed by currents and other movement forces within the water itself. Alternately, a electrically-driven water pump could be utilized to pump sea water into the interior of a closed plastic configuration, thereby effecting the erect, inflated shape.

It should now be appreciated that the practice of the present invention provides an array 10 comprising elements of flexible materials so as to be rolled into a predetermined shape, such as a cylinder, for its stowed condition, and then to be uncoiled into various shapes, such as those shown in FIGS. 5(a)-5(e), each of which provides for a predetermined array for the pressure sensitive polymer piezoelectric transducers. The array 10, of the present invention, is extremely reliable because it virtually has no moving parts and also the array 10 is relatively low in cost because of the inexpensive polymer material used for the transducer and the plastic material used for the roll.

Many modifications and variations of the present invention are possible in view of the above disclosure. It therefore to be understood, that within the scope of the appended claims, the invention may be practiced otherwise than specifically described.

What is claimed is:

1. An arrangement of transducers into a variety of preselectable arrays, said transducers transforming compression waves in a liquid medium into electric waves in an electrical circuit, said preselectable array comprising:
    (a) a roll of tubular plastic material having predetermined lengthwise and widthwise dimensions and with an inner and an outer surface, said plastic material having a characteristic of being pliant so as to readily assume a predetermined shape and also having a characteristic that produces a strong tendency to uncoil from said predetermined shape;
    (b) a plurality of said transducers each being of a polymer piezoelectric material having a characteristic of being pliant so as to readily assume said predetermined shape, said plurality of transducers being affixed to one of said surfaces of said roll, said plurality of transducers being predeterminedly located on said one surface so as to be arranged into one of said variety of preselectable arrays; and
    (c) a plurality of electrodes respectively connected to said plurality of said transducers, each of said electrodes having a characteristic of being pliant so as to readily assume said predetermined shape, each of said electrodes having provisions so that one of its ends may be connected to an external utilization means of said array;
    whereby each of said pliant tubular roll, transducers and electrodes readily assume a stowed condition having a shape corresponding to said predetermined shape when said tubular roll is coiled-up, and said transducers being arranged into said variety of preselectable arrays when said tubular roll is uncoiled.

2. An arrangement of transducers into preselectable arrays according to claim 1, wherein said plastic roll comprises a material selected from the group comprising mylar and polyethylene and has a thickness of about 1 mil.

3. An arrangement of transducers into preselectable arrays according to claim 1, wherein said polymer piezoelectric transducers each comprises polyvinylidene fluoride (PVDF) and has a thickness of about 20 mils.

4. An arrangement of transducers into preselectable arrays according to claim 1, further comprising a preamplifier connected to a respective transducer.

5. An arrangement of transducers into preselectable arrays according to claim 1, further comprising a preamplifier connected to one or more transducers.

6. An arrangement of transducers into preselectable arrays according to claim 1, wherein said electrodes are selected from group comprising laminated in the form of thin ribbon cables, coated in the form of electrically conductive material, coated in the form of electrically conductive wire and deposited in the form of a plated surface of an electrically conductive material.

7. An arrangement of transducers into preselectable arrays according to claim 1, wherein said transducers are affixed to said one surface of said tubular roll by means of a compliant silicone material.

8. An arrangement of transducers into preselectable arrays according to claim 1, wherein said predetermined shape of said stowed condition is cylindrical, and said variety of preselectable arrays of said uncoiled tubular roll is selected from the group comprising a horizontal array, a vertical array, a rectangular array, and a three-dimensional cylindrical array.

9. An arrangement of transducers into a variety of preselectable arrays according to claim 1, wherein said utilization means is an underwater listening device.

10. An arrangement of transducers into a variety of preselectable arrays according to claim 1, wherein said utilization means is a geophysical survey device.

* * * * *